United States Patent [19]
Killen

[11] 4,031,848
[45] June 28, 1977

[54] INERTIAL PERFORMANCE INDICATOR

[75] Inventor: Robert H. Killen, Pasadena, Calif.

[73] Assignee: Wayne D. Steimle, Arcadia, Calif.

[22] Filed: Mar. 17, 1976

[21] Appl. No.: 667,487

[52] U.S. Cl. .......................... 116/114 AH; 73/514
[51] Int. Cl.² ........................................ G01P 15/02
[58] Field of Search .............. 116/114 AH; 73/514, 73/492, 515

[56] References Cited
UNITED STATES PATENTS

| 3,168,831 | 2/1965 | Wagner | 73/492 |
| 3,503,364 | 3/1970 | Dirks | 116/114 AH |

FOREIGN PATENTS OR APPLICATIONS

| 1,265,338 | 5/1961 | France | 73/492 |
| 16,395 | 3/1968 | Japan | 116/114 AH |

*Primary Examiner*—James J. Gill
*Attorney, Agent, or Firm*—William W. Haefliger

[57] ABSTRACT

An inertial performance indicator comprises
a. a carrier having a downwardly dished upper surface,
b. a ball supported on said surface in a rest position, the ball adapted to be bodily displaced out of said rest position in response to predetermined acceleration of the carrier in a generally horizontal direction, and
c. means to adjustably support and level said carrier so that said upper surface is approximately level relative to horizontal.

8 Claims, 6 Drawing Figures

U.S. Patent June 28, 1977 4,031,848
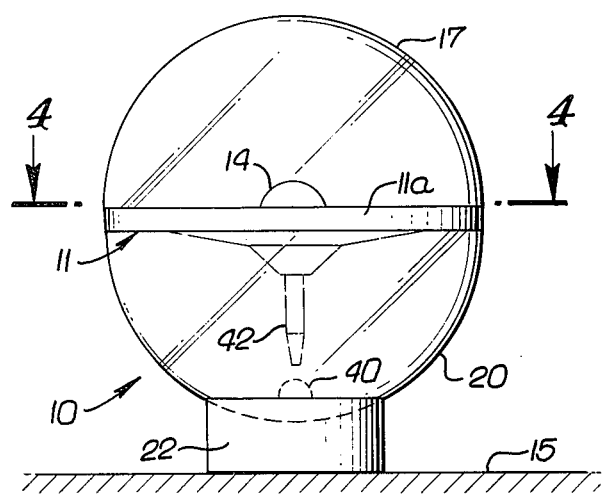
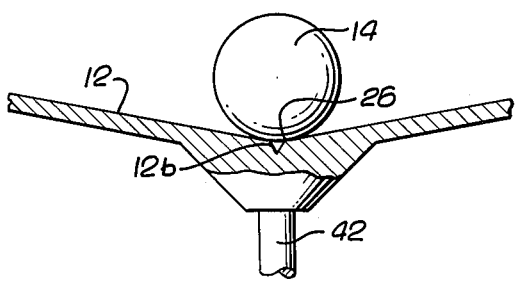
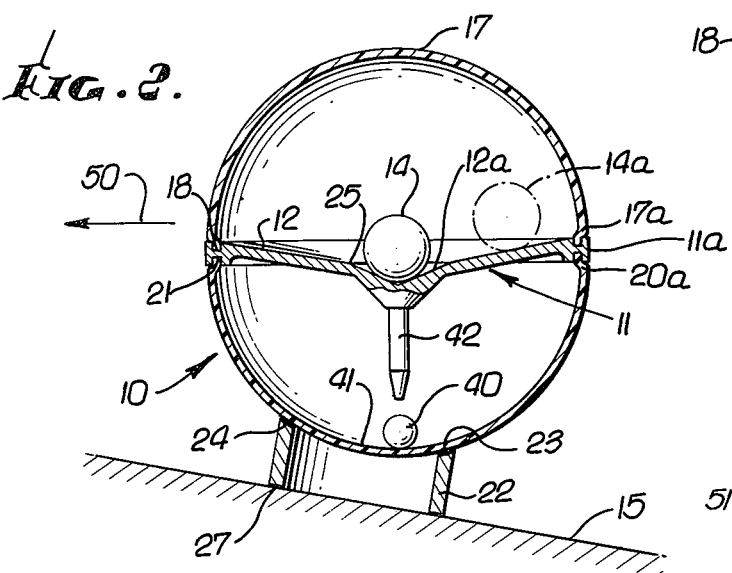
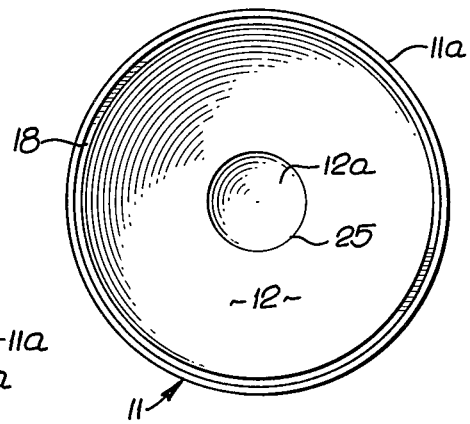
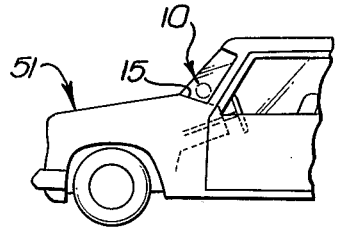
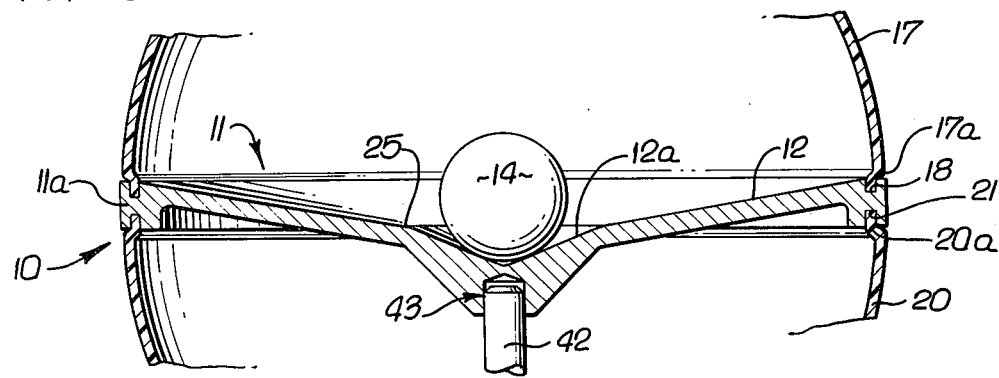

INERTIAL PERFORMANCE INDICATOR

BACKGROUND OF THE INVENTION

This invention relates generally to inertial displacement, and more particularly concerns simple apparatus to indicate the occurrence of a predetermined level of acceleration.

In keeping with recent efforts to prevent fuel waste, there is a need for simple apparatus to indicate to vehicle operators when a predetermined level of acceleration has been reached or exceeded. Such excess acceleration results in fuel wastage. While various devices have been proposed in the past, none to my knowledge has embodied the unusual advantages in construction, mode of operation and results as are now made possible by the present inertial performance indicator.

SUMMARY OF THE INVENTION

Basically, the invention is embodied in an indicator which comprises:

a. a carrier having a downwardly dished upper surface,
b. a ball supported on said surface in a rest position, the ball adapted to be bodily displaced out of said rest position in response to predetermined acceleration of the carrier in a generally horizontal direction, and
c. means to adjustably support and level said carrier so that said upper surface is approximately level relative to horizontal.

As will appear, the carrier upper surface typically defines a local recess receiving a lower portion of the ball in rest position to restrain ball lateral displacement; an upper housing for the carrier may be defined by a transparent upper hemisphere; the adjustable support and leveling means may include elements, such as ball and socket elements forming a universal joint below the carrier; the ball element may be defined by a transparent lower hemisphere, and the socket element may be defined by an annulus to which the ball element may be releasably retained after adjustment shifting; and a level indicating ball and pointer may be contained within the lower hemisphere in the manner to be described, and facilitating rapid leveling of the carrier for accurate sensing of excess vehicle acceleration.

These and other objects and advantages of the invention, as well as the details of an illustrative embodiment, will be more fully understood from the following description and drawings, in which:

DRAWING DESCRIPTION

FIG. 1 is an elevation showing an indicator embodying the invention;

FIG. 2 is a view like FIG. 1, showing the indicator mounted on a tilted surface;

FIG. 3 is an enlarged fragmentary elevation showing details of construction;

FIG. 4 is a plan view on lines 4—4 of FIG. 1;

FIG. 5 is an enlarged fragmentary elevation showing the construction of a modified indicator; and FIG. 6 shows an automobile on the dashboard of which the indicator is mounted.

DETAILED DESCRIPTION

In FIGS. 1–4, the illustrated inertial performance indicator 10 comprises a carrier, such as is indicated at 11, having a shallowly downwardly dished, generally transversely extending upper surface 12. The carrier 11 may be circular and consist of hard plastic, or other material, and the surface 12 may advantageously define an upwardly opening, shallow, central local recess 12a which may be circular, as shown.

The indicator also includes a metallic ball, as for example steel ball 14, supported on surface 12 in a rest position. The ball and carrier are so proportioned that the ball is adapted to be bodily displaced or jarred transversely out of rest position in response to predetermined acceleration of the carrier in a generally horizontal direction. See for example direction 50, in FIG. 2. Thus, if the indicator is carried on surface 15 in a vehicle, it indicates to the operator that the vehicle has accelerated too rapidly, wasting fuel, whereby the operator may train himself to accelerate less rapidly and at a level below that which jars the ball or roller out of rest position. FIG. 6 shows the indicator on the dashboard of an automobile 51. The indication is visual, and also audible, as the steel ball rolling on the "diaphragm" shaped carrier causes the latter to produce highly audible noise, the latter also being produced by other structure as will be referred to.

FIG. 2 shows recess 12a receiving a substantial lower portion of the ball, and tapered downwardly and conically to greater extent than the surrounding surface 12, so as to closely confine or "center" the ball until acceleration causes the ball to become displaced laterally out of the recess, as indicated by broken lines 14a, the ball then rolling about on the carrier. FIG. 5 on the other hand shows only a small local recess 12b, at the lowermost extent of surface 12, to receive only a very small lower portion of the ball. The ball in FIG. 5 will be displaced in response to quite small acceleration. Accordingly, the size of the recess as related to the size and mass of the ball, determines the critical acceleration above which the ball will be bodily displaced to indicate same. Note edges 25 and 26 of the recesses in FIGS. 2–5, and which act to retain the ball against displacement completely out of the recesses.

The indicator may also include a transparent upper housing, as for example upper plastic shell 17 in the form of a dome or hemisphere. Shell 17 has an annular rim 17a received in an annular groove 18 formed by an enlarged peripheral rim portion 11a of the carrier 11. Housing or shell 17 extends protectively over upper surface 12.

A further feature of the invention concerns the provision of means to adjustably support and level the carrier, so that the upper surface 12 is approximately level relative to horizontal. Such means may advantageously include elements forming a universal joint, as for example a ball and socket joint, below the level of the carrier. In the drawings, the ball element comprises a lower plastic shell 20 in the form of a hemisphere, the upper rim 20a of which fits in a second annular groove 21 formed in carrier rim portion 11a. The socket element is shown to comprise an annulus 22 having an annular rim 23 seating the ball element. An adhesive substance may be supported on the rim, as at 24, to removably adhere to the surface of ball element and retain it in a selected position corresponding to level positions of the carrier 11. One such highly effective substance is SKOTCH tape, a produce of 3M Company. Also, the lower edge 27 of the annulus 22 may be suitably bonded to surface 15.

The hemisphere 20 may advantageously consist of transparent plastic material, so that a level sensor within the hemisphere may be viewed, enabling rotation of the hemisphere "ball" in the socket to achieve leveling of the carrier 11, i.e. to a position as seen in FIG. 2, for example. The sensor may advantageously include a "leveling" ball 40 rollably supported on a downwardly dished (and typically spherical) interior surface 41 associated with or defined by the lower hemisphere 20, as shown; also, a pointer 42 is advantageously provided to extend downwardly coaxially with the disc-shaped carrier 11. The pointer is integral with the carrier, as at press-fit interconnection 43, and points toward the center of ball 40 when level is achieved, as in FIG. 2. Ball 40 may consist of metal such as steel, and is normally considerably smaller than ball 14, so that it offers a small target toward which the pointer may be accurately and preliminarily aimed.

Finally, the annulus 22 is preferably dark in color to prevent light reflection; and the hemispherical windows 17 and 20 are typically slightly "smoky" to prevent reflections. Further, the apparatus may be used to monitor the rate of stopping and turning corners, resulting in savings in brake and tire wear, decreased fuel consumption and better and safer driving habits. Also, audible sound is produced by the impact of the steel ball against the upper hemisphere. The surface 12 is angled to return the ball to center, after allowing the ball to continue to strike the hemisphere several times, especially in response to higher accelerations of the vehicle.

I claim:

1. An inertial performance indicator, comprising
   a. a carrier having a downwardly dished upper surface,
   b. a first ball supported on said surface in a rest position, the ball adapted to be bodily displaced out of said rest position in response to predetermined acceleration of the carrier in a generally horizontal direction, and
   c. means to adjustably support and level said carrier so that said upper surface is approximately level relative to horizontal, said means including ball and socket joint elements forming a universal joint below the level of the carrier,
   e. said means including a leveling ball rollably supported on a downwardly dished interior surface associated with the lower hemisphere, there being a pointer integral with the carrier and projecting downwardly therefrom to point toward the leveling ball.

2. The indicator of claim 1 wherein said upper surface defines an upwardly opening local recess receiving a lower portion of the first ball at said rest position.

3. The indicator of claim 1 wherein said recess is defined by locally downwardly tapering annular extent of said upper surface.

4. The indicator of claim 1 including a transparent upper housing extending over said upper surface.

5. The indicator of claim 4 wherein said upper housing and said carrier have rim portions which extend in mutually adjacent relation.

6. The indicator of claim 1 including holder means to hold the ball and socket elements in a selected position of adjustment after relative universal swiveling of one element relative to the other.

7. The indicator of claim 1 wherein the ball element has the shape of a lower hemisphere peripherally supported the carrier.

8. An inertial performance indicator, comprising
   a. a carrier having a downwardly dished upper surface,
   b. a first ball supported on said surface in a rest position, the ball adapted to be bodily displaced out of said rest position in response to predetermined acceleration of the carrier in a generally horizontal direction, and
   c. means to adjustably support and level said carrier so that said upper surface is approximately level relative to horizontal, said mean including ball and socket joint elements forming a universal joint below the level of the carrier,
   d. the ball element having the shape of a lower hemisphere peripherally supporting the carrier,
   e. the socket element comprising an annulus having an annular rim seating the ball element, the ball element being transparent, and there being a level sensor within the transparent ball element.

* * * * *